United States Patent
Sun et al.

(10) Patent No.: US 9,692,576 B1
(45) Date of Patent: Jun. 27, 2017

(54) METHODS AND SYSTEMS FOR TRANSMITTING HYBRID BEACON SIGNALS IN WI-FI

(71) Applicant: Marvell International Ltd., Hamilton (BM)

(72) Inventors: Yakun Sun, Sunnyvale, CA (US); Liwen Chu, San Ramon, CA (US); Lei Wang, San Diego, CA (US); Jinjing Jiang, San Jose, CA (US); Hongyuan Zhang, Fremont, CA (US); Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 104 days.

(21) Appl. No.: 14/693,603

(22) Filed: Apr. 22, 2015

Related U.S. Application Data (60) Provisional application No. 61/986,733, filed on Apr. 30, 2014.

(51) Int. Cl.
*H04L 5/00* (2006.01)
*H04W 72/12* (2009.01)
*H04L 1/08* (2006.01)
*H04W 84/12* (2009.01)

(52) U.S. Cl.
CPC ............. *H04L 5/0053* (2013.01); *H04L 1/08* (2013.01); *H04L 5/0048* (2013.01); *H04W 72/1263* (2013.01); *H04W 84/12* (2013.01)

(58) Field of Classification Search
CPC ....... H04L 5/0048; H04L 5/0053; H04L 1/08; H04W 72/1263; H04W 84/12
See application file for complete search history.

(56) References Cited

U.S. PATENT DOCUMENTS

| | | | |
|---|---|---|---|
| 2013/0230035 A1* | 9/2013 | Grandhi | H04W 48/16 370/338 |
| 2014/0192785 A1* | 7/2014 | Gong | H04W 56/001 370/336 |
| 2015/0098459 A1* | 4/2015 | Lee | H04W 48/16 370/338 |
| 2015/0208385 A1* | 7/2015 | Kwon | H04W 72/1289 370/336 |
| 2016/0183258 A1* | 6/2016 | Matsuo | H04W 74/006 370/348 |

\* cited by examiner

*Primary Examiner* — Paul H Masur (57) ABSTRACT

Methods and systems are disclosed for transmitting high efficiency signals. The method includes creating a first signal and a second signal each comprising a plurality of information fields. The method includes determining respective intervals for repeated transmissions of each of the first signal and the second signal. The method includes determining whether a first transmission of the repeated transmissions of the first signal will be consecutively followed by a second transmission of the repeated transmissions of the second signal. The method includes adding scheduling information, based in part on determining the first transmission will be consecutively followed by the second transmission, indicating that the first transmission will be consecutively followed by the second transmission.

20 Claims, 4 Drawing Sheets

METHODS AND SYSTEMS FOR TRANSMITTING HYBRID BEACON SIGNALS IN WI-FI

CROSS REFERENCE TO RELATED APPLICATION

This disclosure claims the benefit under 35 U.S.C. §119(e) of U.S. Provisional Application No. 61/986,733, filed Apr. 30, 2014, which is incorporated by reference in its entirety.

FIELD OF USE

This disclosure relates to methods and systems for transmitting high efficiency hybrid Beacon signals to reduce redundancy and overhead in wireless local area networks.

BACKGROUND OF THE DISCLOSURE

Wireless local area networks based on the 802.11 protocol include access points and stations that transmit several types of management frames. Management frames are used to provide information about the network and maintain communication standards between the networks' access points and stations. One of these management frames is the Beacon frame. Beacon frames contain information about the network and its capabilities. Some fields in a Beacon frame may include a timestamp, a Traffic Indicator Map, the Quality of Service, the system configuration, and the network capability.

The Beacon frame may be transmitted at set intervals to facilitate discovery of the network by new access points and stations. The Beacon frame may also serve to synchronize information between the access points and stations currently connected to the network. However, frequent transmission of the Beacon frame may cause a high overhead in the network transmissions. The Beacon frame may contain information that rarely changes, and frequent transmission of this information may be redundant and inefficient. Transmitting the Beacon frame at set intervals may also be inefficient as the interval cannot adapt to network conditions.

SUMMARY

In accordance with an embodiment of the present disclosure, a method is provided for transmitting high efficiency signals. The method may include creating a first and second signal, each of which includes a respective subset of a plurality of information fields. The method may include determining intervals for repeated transmissions of each of the first signal and the second signal. The method may include determining whether a first transmission of the repeated transmissions of the first signal will be followed by a second transmission of the repeated transmissions of the second signal. The method may include adding scheduling information, based at least in part on determining that the first transmission will be consecutively followed by the second transmission, to the first transmission indicating that the first transmission will be followed by the second transmission.

One or more implementations of the present disclosure may provide one or more of the following advantages. In some implementations, the method may include setting an offset between the repeated transmissions of the first and second signal. In some implementations, the method may include determining whether a third transmission of the repeated transmissions of the first signal and the second transmission are scheduled for transmission at the same time, and cancelling the third transmission in response. In some implementations, the method may include removing the scheduling information from the first transmission in response to determining that the first transmission will not be consecutively followed by the second transmission.

In accordance with an embodiment of the present disclosure, a system is provided for transmitting high efficiency signals. The system may include control circuitry configured to create a first and second signal, each of which includes a respective subset of a plurality of information fields. The system may include control circuitry configured to determine intervals for repeated transmissions of each of the first signal and the second signal. The system may include control circuitry configured to determine whether a first transmission of the repeated transmissions of the first signal will be followed by a second transmission of the repeated transmissions of the second signal. The system may include control circuitry configured to add scheduling information, based at least in part on determining that the first transmission will be consecutively followed by the second transmission, to the first transmission indicating that the first transmission will be followed by the second transmission.

One or more implementations of the present disclosure may provide one or more of the following advantages. In some implementations, the system may include control circuitry configured to set an offset between the repeated transmissions of the first and second signal. In some implementations, the system may include control circuitry configured to determine whether a third transmission of the repeated transmissions of the first signal and the second transmission are scheduled for transmission at the same time, and cancel the third transmission in response. In some implementations, the system may include control circuitry configured to remove the scheduling information from the first transmission in response to determining that the first transmission will not be consecutively followed by the second transmission.

In some implementations, the interval for repeated transmissions of the first signal may be less than the interval for the repeated transmissions of the second signal. In some implementations, the interval for repeated transmissions of the first signal may be modified based on a frequency of incoming requests. In some implementations, the interval for repeated transmissions of the first signal may be modified based on a change in the information fields of the first signal. In some implementations, the first signal may comprise a first partition of the plurality of information fields, and the second signal may comprise the first and a second partition of the plurality of information fields. In some implementations, the scheduling information may include a time for a next transmission of the first or second signal, the interval for repeated transmissions of the first or second signal, and a format of the first or second signal. In some implementations, the information fields of the first signal comprise a timestamp or a Traffic Indicator Map.

BRIEF DESCRIPTION OF THE DRAWINGS

Further features of the disclosure, its nature, and various advantages, will be apparent upon consideration of the following detailed description, taken in conjunction with the accompanying drawings, in which.

DETAILED DESCRIPTION

To provide an overall understanding of the disclosure, certain illustrative embodiments will now be described, including methods and systems for transmitting high efficiency Beacon frames. However, the methods and systems described herein may be adapted and modified as is appropriate for the application being addressed, and the methods and systems described herein may be employed in other suitable applications.

Figure 1:
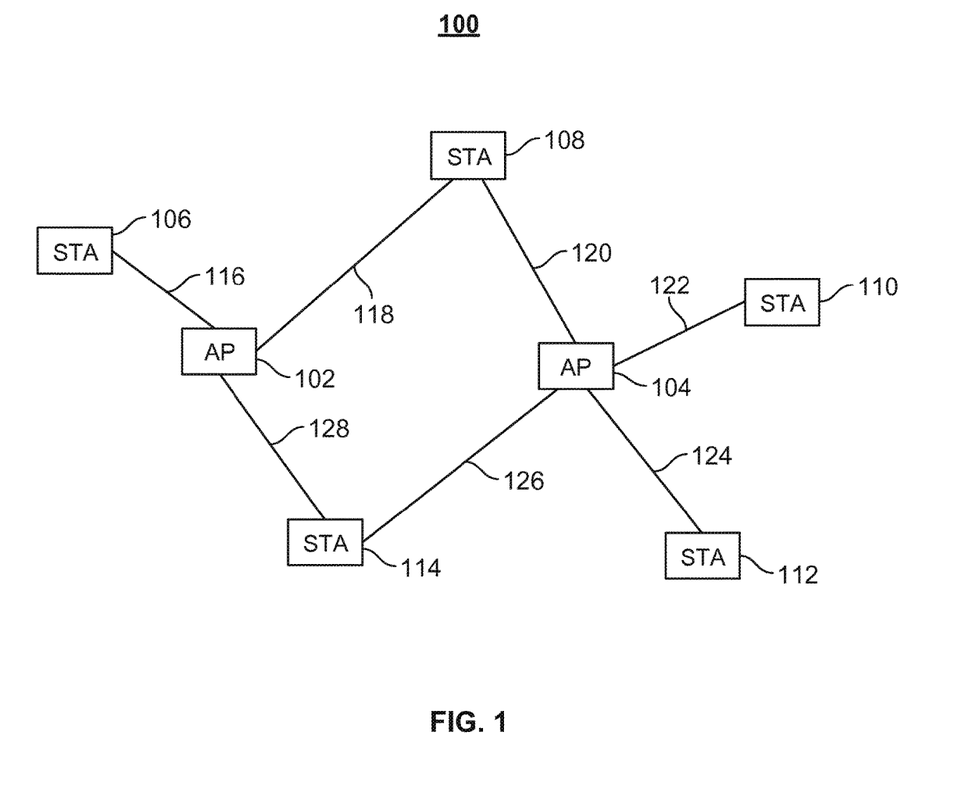
FIG. 1 shows a block diagram of an illustrative wireless local area network, in accordance with some embodiments of the present disclosure.

FIG. 1 shows a block diagram of an illustrative wireless local area network (WLAN) 100, incorporating embodiments of the present disclosure. WLAN 100 may be a Wi-Fi network based on 802.11 protocol standards. It is understood that WLAN 100 may include a different configuration of access points and stations than shown, or employ a different protocol than Wi-Fi to create a wireless network.

WLAN 100 may include access points and stations. Access points such as AP 102 and AP 104 may be devices that allow wireless-enabled devices to connect to a wired network using Wi-Fi protocol. WLAN 100 may include any number of access points.

Stations such as STA 106, STA 108, STA 110, STA 112, and STA 114 may be wireless-enabled devices that communicate such access points to connect wirelessly to a wired network. For example, a station may be a computer, phone, or tablet that is Wi-Fi enabled. It is not necessary for all stations to be the same type of device. WLAN 100 may include any number of stations.

Connections 116, 118, 120, 122, 124, 126, and 128 represent possible communication links. A possible communication link may enable a station to receive information from a wired network through an access point. A possible communication link may also enable a station to send information to a wired network through an access point. A possible communication link may also enable communications between access points and stations. An access point may be able to communicate with any number of stations. For example, AP 102 may have three possible communication links 116, 118, and 128, while AP 104 may have four possible communication links 120, 122, 124, and 126. In some embodiments, an access point may have a possible communication link with another access point. For example, AP 102 may have a possible communication link with AP 104. A station may have possible communication links with any number of access points. For example, STA 110 has one possible communication link 122 with AP 104, while STA 108 has two possible communication links 118 and 120 with AP 102 and AP 104 respectively.

Each possible communication link 116, 118, 120, 122, 124, 126, and 128 may be a half-duplex link. That is, each possible communication link may be used by only one of its endpoints at any given time. For example, STA 106 may transmit information to AP 102 using possible communication link 116. During the duration of this transmission, AP 102 may not be able to use possible communication link 116 to simultaneously transfer information to STA 106.

Possible communication links 116, 118, 120, 122, 124, 126, and 128 may all utilize the same communication channel. For example, they may all use the same frequency to transmit information. Hence, only one access point or station may be able to access the communication channel at any given time. For example, only one of AP 102, AP 104, STA 106, STA 108, STA 110, STA 112, and STA 114 may be able to transmit information at any given time. In some embodiments, an access point or station may be able to transmit information simultaneously through more than one possible communication link.

AP 102 and AP 104 may transmit management frames to manage the flow of information and connections in WLAN 100. AP 102 and AP 104 may transmit management frames as signals through communication links 116, 118, 120, 122, 124, 126, and 128. AP 102 and AP 104 may also broadcast management frames as signals that can be picked up by devices not connected to WLAN 100. Management frames may include Beacon frames, which contain information used to synchronize devices connected to WLAN 100 and help new devices connect to WLAN 100. Beacon frames may be transmitted from access points to stations. Management frames may include Probe Request frames, which are transmitted by stations to form a new communication link with an access point. Management frames may include Probe Response frames, which are transmitted by access points in response to Probe Request frames. Management frames may include Association Request frames, which are transmitted by authenticated stations to request an Association ID. Management frames may include Association Response frames, which are transmitted by access points in response to Association Request frames, and may include an Association ID for an authenticated station. In some embodiments, all types of management frames may be transmitted by both access points and stations in WLAN 100.

Beacon frames may be a signal with several data fields transmitted by access points such as AP 102 and AP 104. These data fields may be arranged in any order. Beacon frames may include data fields that are updated frequently. Beacon frames may include a timestamp field. Stations that receive the Beacon frame may use the timestamp field to update their local time. This may enable synchronization of local time used by all stations in WLAN 100. The timestamp field may be updated frequently to ensure that the stations are all synchronized to the current time. Beacon frames may include a Traffic Indicator Map (TIM) field. A station that receives the Beacon frame may use the TIM field to determine if the access point that transmitted the Beacon frame has additional information for the station. The TIM field may be updated frequently as the access point transmitting the Beacon frame receives additional information for different stations. For example, AP 102 may receive information for STA 106. AP 102 may transmit a Beacon frame through possible communication links 116, 118, and 128 to STA 106, STA 108, and STA 114, respectively. The Beacon frame may indicate that additional information for STA 106 is at AP 102. STA 106 may use the Beacon frame to determine that additional information for it is at AP 102, and use possible communication link 116 to receive this information from AP 102.

Beacon frames may include data fields that are not updated frequently. Beacon frames may contain data fields describing the configuration of WLAN 100. The data fields describing the configuration may include information about the access points, stations, and possible connection links of WLAN 100. The data fields describing the configuration of WLAN 100 may not be updated frequently. Beacon frames may contain data fields describing the capability of WLAN 100. The data fields describing the capability of WLAN 100 may include information about the specifications of the access points, stations, and possible connection links of WLAN 100. The data fields describing the capability of WLAN 100 may include information about the required specifications that new access points or stations must have to join WLAN 100. The data fields describing the capability of WLAN 100 may not be updated frequently. Beacon frames may also contain data fields describing the quality of service associated with WLAN 100, the country associated with WLAN 100, and the frequencies used by possible communication links of WLAN 100. These data fields may not be frequently updated.

Transmitting infrequently updated data fields with every Beacon frame may be a source of inefficiency in the system. The information contained in these data fields may only need to be reaffirmed or updated at long intervals. In some embodiments, the information contained in these data fields may only need to be updated when it changes.

Beacon frames may include data fields available in other types of management frames as well. Transmitting these data fields in both Beacon frames and other management frames may be a source of redundancy in the network. For example, data fields about the configuration and capabilities of WLAN 100 may be available through Probe Response and Association Response frames. An access point or station that does not have information contained in these data fields may be able to request it by transmitting a Probe Request or Association Request frame. Hence, an access point or station that does not have the information contained in these fields does not need to rely on a Beacon frame to receive the information.

Beacon frames may include data fields only used by stations not connected to WLAN 100. These data fields may only be useful to stations when they first establish a connection to an access point in WLAN 100. Transmitting these data fields to every station in WLAN 100 may be a source of inefficiency in the system.

Figure 2:
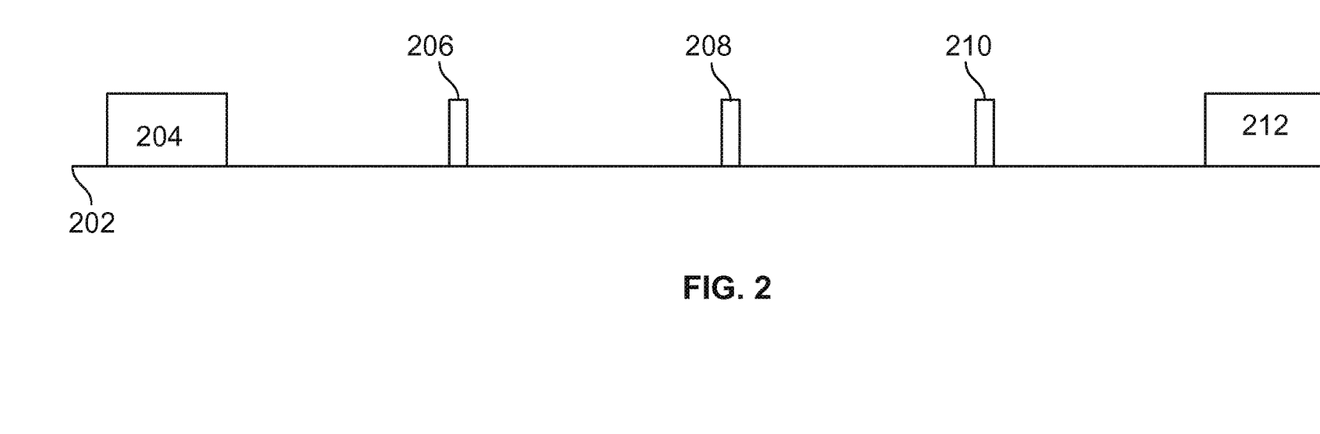
FIG. 2 shows a transmission timeline with two types of Beacon frames, in accordance with some embodiments of the present disclosure.

FIG. 2 shows a transmission timeline with two types of Beacon frames, incorporating some embodiments of the present disclosure. FIG. 2 shows an embodiment of a hybrid Beacon design that may be used to reduce the inefficiency and redundancy of transmitting Beacon frames. A hybrid Beacon design may include multiple Beacon frame formats. Each Beacon frame format may be associated with different data fields and different transmission intervals. A Beacon frame format containing frequently updated information may be transmitted at short intervals, while a Beacon frame format containing rarely updated information may be transmitted at longer intervals. The intervals associated with different Beacon frame formats may be changed if needed to reduce inefficiency and redundancy. In some embodiments, a conventional Beacon frame may be transmitted at a set interval for those stations that are not configured to receive or retrieve information from high efficiency Beacon frame formats. In some embodiments, another type of management frame may be transmitted instead of a Beacon frame format.

FIG. 2 shows transmission timeline 202. Beacon frames 204, 206, 208, 210, and 212 may be transmitted by AP 102 at the different times represented by points on transmission timeline 202. Beacon frames 204 and 212 are of a full Beacon frame format. Beacon frames 206, 208, and 210 are of a high efficiency Beacon frame format. Full Beacon frame format may include all the information from a conventional Beacon frame. For example, data fields describing the configuration and capability of WLAN 100 may be included in full Beacon frames 204 and 212. High efficiency Beacon frame formats may only include frequently updated fields. For example, high efficiency Beacon frames 206, 208, and 210 may include only a timestamp data field and a TIM data field. Full Beacon frames 204 and 212 may take longer to transmit than high efficiency Beacon frames 206, 208, and 210.

In some embodiments, high efficiency Beacon frame formats may include a Beacon scheduling field. In some embodiments, the Beacon scheduling field may indicate if the data fields not included in the high efficiency Beacon frame format have changed. For example, high efficiency Beacon frame 210 may only contain a timestamp field, TIM field, and a Beacon scheduling field. The Beacon scheduling field of high efficiency Beacon frame 210 may indicate that the configuration data fields for WLAN 100 have changed. AP 102 may transmit high efficiency Beacon frame 210 to STA 106. In response to receiving high efficiency Beacon frame 210, STA 106 may determine that it needs to update the configuration data fields stored in STA 106 using the information from the configuration data fields of the next full Beacon frame 212.

In some embodiments, the Beacon scheduling field may indicate the format of the next Beacon to be transmitted. For example, high efficiency Beacon frame 208 may include a Beacon scheduling field indicating that next Beacon frame 210 will be a high efficiency Beacon frame, and that a full Beacon frame will be skipped. High efficiency Beacon frame 210 may include a Beacon scheduling field indicating that next Beacon frame 212 will be a full Beacon frame, and a high efficiency Beacon frame will be skipped.

In some embodiments, the Beacon scheduling field may only be present in the Beacon frame consecutively preceding a full Beacon frame. For example, high efficiency Beacon frames 206 and 208 may not include a Beacon scheduling field as they do not consecutively precede a full Beacon frame. High efficiency Beacon frame 210 may include a Beacon scheduling field as it consecutively precedes full Beacon frame 212. In some embodiments, all Beacon frames may include a Beacon scheduling field. For example, Beacon frames 204, 206, 208, 210, and 212 may all include a Beacon scheduling field.

Full Beacon frames 204 and 212 may be associated with a transmission interval. For example, the transmission interval may be the time from the beginning of the transmission of full Beacon frame 204 by AP 102 to the beginning of the transmission of full Beacon frame 212 by AP 102. The transmission interval for full Beacon frames may be described as a number of time units. For example, the transmission interval for full Beacon frames may be 100 milliseconds.

High efficiency Beacon frames 206, 208, and 210 may be associated with a transmission interval. A transmission interval may be the time between a first target Beacon transmission time (TBTT) and a second TBTT. A TBTT may describe the scheduled start time of a transmission of a Beacon frame. For example, the transmission interval may be the time from the scheduled beginning of the transmission of high efficiency Beacon frame 206 by AP 102 to the scheduled beginning of the transmission of high efficiency Beacon frame 208 by AP 102. In some embodiments, the transmission interval for the high efficiency Beacon frames may be described as a number of time units. For example, the transmission interval for high efficiency Beacon frames may be 25 milliseconds. In some embodiments, the transmission interval for high efficiency Beacon frames may be described as a ratio of the transmission interval for another Beacon frame format. For example, the transmission interval for high efficiency Beacon frames 206, 208, and 210 may be described in relation to full Beacon frames 204 and 212 by the integer 4, indicating that the high efficiency Beacon frames will be transmitted 4 times for every one transmission of the full Beacon frames. In other words, the transmission interval for high efficiency Beacon frames 206, 208, and 210 may be one-fourth of the transmission interval for full Beacon frames 204 and 212. If the transmission interval for full Beacon frames 204 and 212 is 100 milliseconds, the transmission interval for high efficiency Beacon frames 206, 208, and 210 is 25 milliseconds.

In some embodiments, if AP 102 is scheduled to transmit both a full Beacon frame and a high efficiency Beacon frame at the same time, AP 102 may only transmit the Beacon frame with more information, that is, the full Beacon frame. For example, if AP 102 is scheduled to transmit both a high efficiency Beacon frame and full Beacon frame 212, AP 102 may only transmit full Beacon frame 212.

In some embodiments, AP 102 may set an offset between transmissions of full Beacon frames and high efficiency Beacon frames to prevent a situation where AP 102 is scheduled to transmit both a full Beacon frame and a high efficiency Beacon frame at the same time. For example, AP 102 may set an offset of 10 milliseconds to the transmission interval for high efficiency Beacon frames. The transmission interval for full Beacon frames may be 100 milliseconds, so AP 102 may transmit a first full Beacon frame at time t=0 milliseconds, a second full Beacon frame at time t=100 milliseconds, a third full Beacon frame at time t=200 milliseconds, and so on. The transmission interval for high efficiency Beacon frames may be 25 milliseconds with an added offset of 10 milliseconds, so AP 102 may transmit a first high efficiency Beacon frame at time t=35 milliseconds, a second high efficiency Beacon frame at time t=60 milliseconds, a third high efficiency Beacon frame at time t=85 milliseconds, a fourth high efficiency Beacon frame at time t=110 milliseconds, and so on. The offset ensures that a full Beacon frame and a high efficiency Beacon frame are not scheduled for transmission at the same time.

Although FIG. 2 only shows two Beacon frame formats, full Beacon frame format and high efficiency Beacon frame format, any number of Beacon frame formats may be defined. Each Beacon frame format may contain a different set of data fields. In some embodiments, the Beacon frame formats may have static data fields. That is, the data fields present in each Beacon format may be pre-defined. In some embodiments, the Beacon frame formats may have dynamic data fields. That is, the data fields present in each Beacon format may change. The dynamic data fields present in each Beacon format may be announced as part of the full Beacon frame format, or another Beacon frame format. The transmission intervals for each Beacon frame format may be announced as part of the full Beacon frame format, or another Beacon frame format. In some embodiments, the transmission intervals may be announced as a number of time units. In some embodiments, the transmission intervals may be announced as a ratio of the transmission interval of a different Beacon frame format. The transmission intervals for different Beacon frame formats may be based on the likelihood of change of the data fields of the Beacon frame formats.

Figure 3:
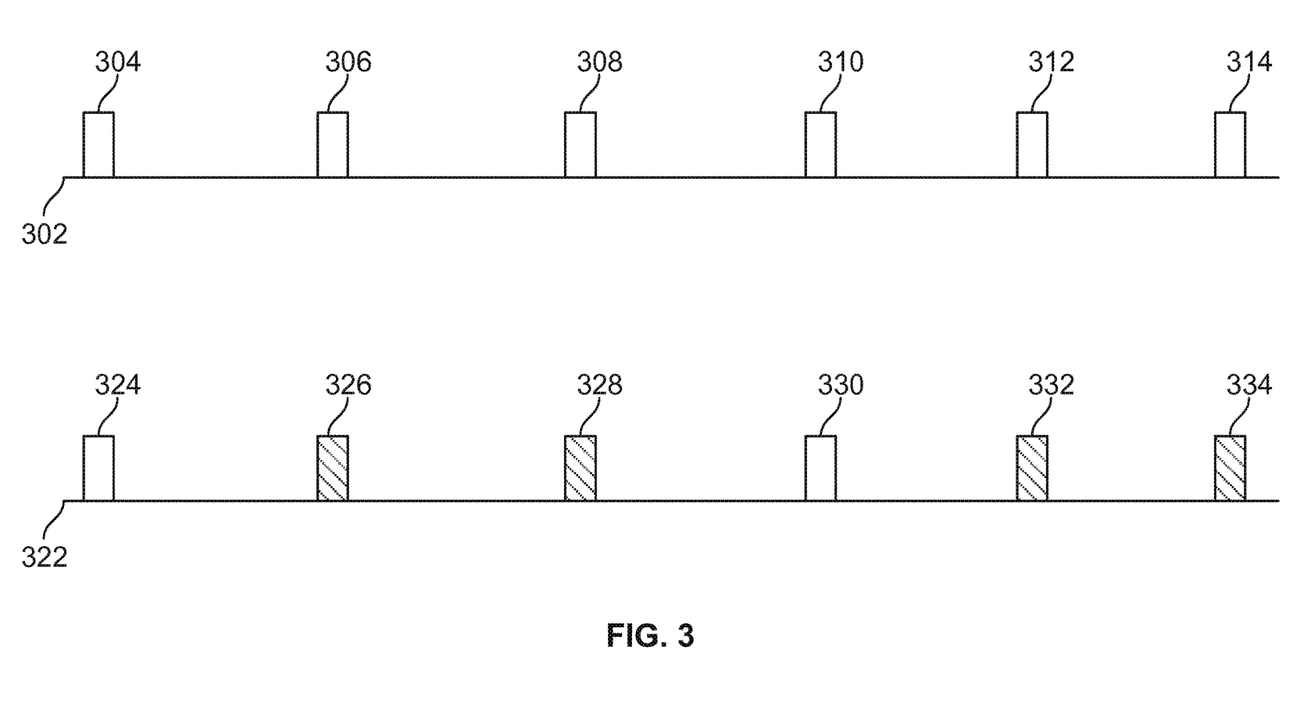
FIG. 3 shows two transmission timelines with Beacon frames transmitted according to adaptive transmission intervals, in accordance with some embodiments of the present disclosure.

FIG. 3 shows two transmission timelines with Beacon frames with adaptive transmission intervals, incorporating some embodiments of the present disclosure. AP 102 may define the transmission intervals of the different Beacon frame formats it transmits. AP 102 may define and modify these transmission intervals to transmit Beacon frame formats appropriate to the needs of the stations in WLAN 100. In some embodiments, AP 102 may indicate the transmission intervals associated with each Beacon frame format in a data field in the transmission of the respective Beacon frame format. In some embodiments, AP 102 may use the Beacon scheduling field in each Beacon frame transmission to announce information about the transmission intervals.

Beacon frames may include data fields for different purposes. Some data fields, such as configuration data fields and capability data fields, may be most useful to new stations that wish to join WLAN 100. When AP 102 joins WLAN 100, it may need to transmit Beacon frame formats containing these data fields to STA 106, STA 108, and STA 114 to enable the creation of possible communication links 116, 118, and 126, respectively. When AP 102 receives frequent Probe Request frames from new stations, indicating that new stations wish to join WLAN 100, AP 102 may need to transmit Beacon frame formats containing these data fields frequently. When AP 102 determines that the information in the configuration data fields or the capability data fields has changed, AP 102 may need to transmit Beacon frame formats containing these data fields frequently. When AP 102 is not trying to create possible communication links with stations or receiving Probe Request frames from stations, and the information in these data fields has not changed, AP 102 may not need to transmit Beacon frame formats containing these fields frequently.

Unshaded Beacon frames 304, 306, 308, 310, 312, 314, 324, and 330 may represent Beacon frames of the full Beacon frame format. These Beacon frames may include information most useful to new stations that wish to join WLAN 100. Timeline 302 may represent a situation when AP 102 joins WLAN 100, and needs to transmit full Beacon frames to STA 106, STA 108, and STA 114 to enable the creation of possible communication links 116, 118, and 126, respectively. Timeline 302 may represent a situation when AP 102 receives frequent Probe Request frames from new stations, indicating that new stations wish to join WLAN 100. In some embodiments, timeline 302 may represent a situation when AP 102 receives incoming requests, such as Probe Request frames, at a frequency higher than a threshold frequency. The threshold frequency may be a pre-determined value, or may be adaptively modified by AP 102. Timeline 302 may represent a situation when AP 102 determines that the information in the configuration data fields or the capability data fields has changed. In these situations corresponding to timeline 302, AP 102 may modify the transmission interval for full Beacon frames to transmit full Beacon frames at short transmission intervals. In some embodiments, AP 102 may transmit full Beacon frames at default transmission intervals in timeline 302.

Timeline 322 may represent a situation when AP 102 is not trying to create possible communication links with stations or receiving Probe Request frames from stations, and the information in these data fields has not changed. AP 102 may modify the transmission interval for full Beacon frames to transmit full Beacon frames at longer transmission intervals in timeline 322 than in timeline 302. For example, the transmission interval between full Beacon frames 324 and 330 in timeline 322 is longer than the transmission interval between full Beacon frames 304 and 306 in timeline 302. In some embodiments, the longer transmission interval for full Beacon frames in timeline 322 may be a ratio of the transmission interval for full Beacon frames in timeline 302.

For example, the transmission interval between full Beacon frames 324 and 330 in timeline 322 is three times the transmission interval between full Beacon frames 304 and 306 in timeline 302.

An advantage of the longer transmission interval between full Beacon frames 324 and 330 in timeline 322 may be that stations connected to AP 102 get more time to communicate with AP 102. For example, in timeline 322, AP 102 spends less time transmitting full Beacon frames, and hence has more time to communicate with STA 106 through possible communication link 116. A disadvantage of the longer transmission interval may be that AP 102 may not be able to provide stations with updates on frequently changing information. For example, STA 106 may not receive an updated TIM as frequently when AP 102 uses a longer transmission interval. STA 106 may rely on the TIM field to determine if AP 102 has additional information for it. A longer Beacon frame transmission interval may mean that STA 106 needs to wait longer to determine if AP 102 has additional information for it, and AP 102 needs additional buffer capacity to store the additional information for STA 106 for longer.

In some embodiments, AP 102 may transmit high efficiency Beacon frames during the longer transmission interval between full Beacon frames used in timeline 322. Shaded Beacon frames 326, 328, 332, and 334 may indicate high efficiency Beacon frames. High efficiency Beacon frames 326, 328, 332, and 334 may include TIM information formatted such that even conventional legacy stations can use the TIM information in the Beacon frames to determine if AP 102 has additional information for the stations. High efficiency Beacon frames 326, 328, 332, and 334 may include other frequently changing data fields, such as a timestamp data field.

AP 102 may modify the transmission interval associated with high efficiency Beacon frames 326, 328, 332, and 334 in timeline 322 based on the rate of change of the data fields of the high efficiency Beacon frames. In some embodiments, the transmission interval for high efficiency Beacon frames in timeline 322 may be a ratio of the transmission interval for full Beacon frames in timeline 322. For example, the transmission interval between full Beacon frames 324 and 330 in timeline 322 is three times the transmission interval between high efficiency Beacon frames 326 and 328 in timeline 322.

Although FIG. 3 shows two Beacon frame formats, a full Beacon frame format and a high efficiency Beacon frame format, AP 102 may transmit any number of different Beacon frame formats. In some embodiments, different Beacon frame formats may be referred to as multi-level Beacons. A Level-1 Beacon frame format may be the most frequently transmitted Beacon containing only the most frequently updated data fields. The transmission interval of the Level-1 Beacon frame format may be pre-defined based on system resources and requirements, such as the maximum allowed latency for STA 106 to receive a Beacon frame from AP 102, and the buffer capacity of AP 102.

All other Beacon frame format levels may have adaptive transmission intervals and/or dynamic data fields. All other Beacon frame format levels' transmission intervals may be described as ratios of the Level-1 Beacon frame format's transmission interval. For example, the Level-1 Beacon frame format may have a transmission interval of $x=p$. A Level-2 Beacon frame format may be associated with a ratio of n, where n is greater than or equal to 1. The transmission interval of the Level-2 Beacon frame format may be $x=(n*p)$. A Level-3 Beacon frame format may be associated with a ratio of m, where m is greater than or equal to n. The transmission interval of the Level-3 Beacon frame format may be $x=(m*p)$. Both n and m may be adaptive values modified by AP 102, and may be included in the Beacon scheduling fields of any of Level-1, Level-2 or Level-3 Beacon frame formats.

In some embodiments, the Beacon scheduling field may be included in all Beacon frame format levels. In some embodiments, the Beacon scheduling field may only be included in the Beacon frame consecutively preceding a Beacon frame of a different level. The Beacon scheduling field may contain information including the next transmission time of all Beacon format levels, the transmission interval of all Beacon format levels, and the data fields present in all Beacon format levels.

In some embodiments, the Beacon frame formats may include data fields defined in a backward inclusion manner. For example, the Level-2 Beacon frame format may include all the data fields of the Level-1 Beacon frame format, and the Level-3 Beacon frame format may include all the data fields of the Level-2 Beacon frame formats.

In some embodiments, the Level-1 Beacon frame format may be a high efficiency Beacon frame format, and the Level-2 Beacon frame format may be a full Beacon frame format. In some embodiments, the Level-1 Beacon frame format may be a high efficiency Beacon frame format, and the Level-2 Beacon frame format may be a different management frame. In some embodiments, the Level-1 Beacon frame format may be a high efficiency Beacon frame format, the Level-2 Beacon frame format may be a different management frame, and the Level-3 Beacon frame format may be a full Beacon frame format.

AP 102 may schedule multiple Beacon frame format levels for transmission at the same time. AP 102 may choose only one of the multiple scheduled Beacon frame formats for transmission. In some embodiments, AP 102 may choose the highest level Beacon frame format. This may be the least frequently transmitted Beacon frame format. In some embodiments, AP 102 may choose the Beacon frame format containing the most information of the multiple scheduled Beacon frame formats. In some embodiments, AP 102 may transmit a Beacon frame format containing all the information of the multiple scheduled Beacon frame formats, even if the chosen Beacon frame format was not originally scheduled for transmission.

Figure 4:
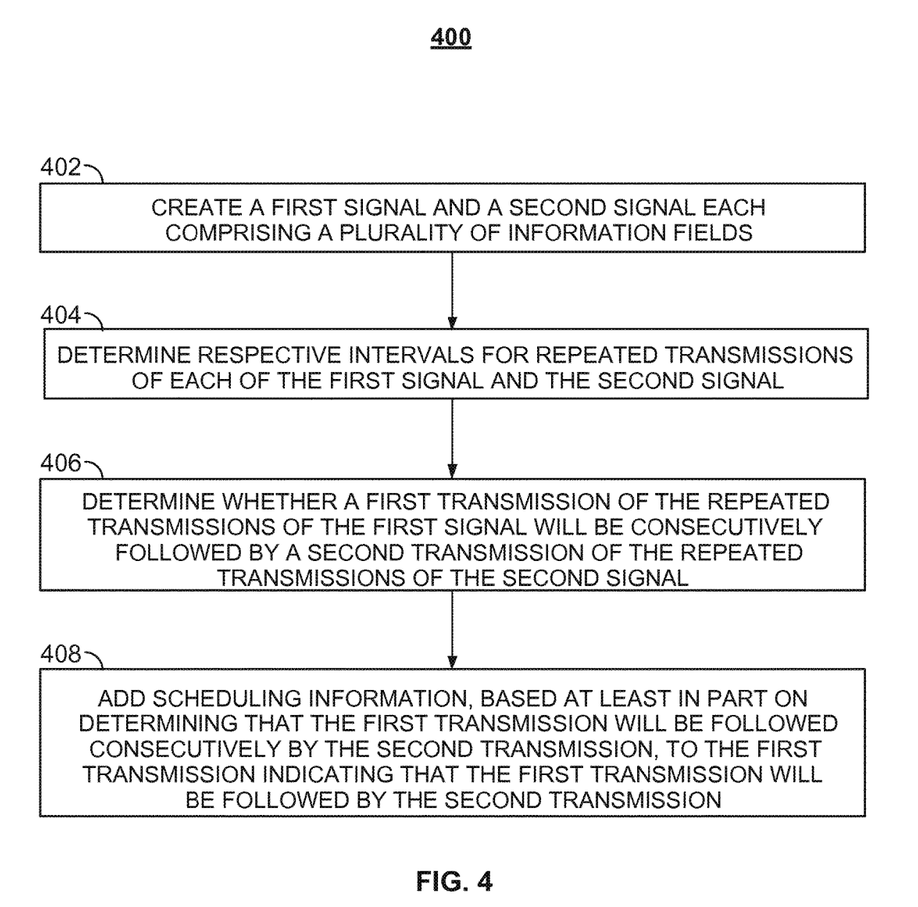
FIG. 4 shows a flow diagram of a process for transmitting high efficiency Beacon frames, in accordance with some embodiments of the present disclosure.

FIG. 4 shows a flow diagram of process 400 for transmitting high efficiency Beacon frames incorporating some embodiments of the present disclosure. Process 400 begins at 402 by creating a first signal and a second signal each comprising a plurality of information fields. The first signal may be a Beacon frame in a first format, and the second signal may be a Beacon frame in a second format. The plurality of information fields of the first signal may be different from the plurality of information fields of the second signal. The first signal may include frequently changing data fields, such as a timestamp field and a TIM field. The second signal may include rarely changing data fields, such as configuration data fields and capability data fields. The first and second signal may be created by AP 102. In some embodiments, AP 102 may create the signals using dynamic data fields and/or adaptive transmission intervals. In some embodiments, AP 102 may create the signals using pre-defined specifications.

Process 400 progresses to 404 by determining respective intervals for repeated transmissions of each of the first signal and the second signal. AP 102 may determine a transmission interval for the first signal and a transmission interval for the second signal. The transmission interval for the first signal may be different from the transmission interval for the second signal. The transmission interval for the first signal may be expressed as a ratio of the transmission interval for the second signal. The transmission intervals for the first and second signals may be included in the Beacon scheduling fields in the first and second signals. The transmission intervals for the first and second signals may be adaptive, and hence modified by AP 102 as necessary.

Process 400 progresses to 406 by determining whether a first transmission of the repeated transmissions of the first signal will be consecutively followed by a second transmission of the repeated transmissions of the second signal. For example, AP 102 may determine that a Level-1 Beacon frame will be consecutively followed by a Level-2 Beacon frame. AP 102 may determine this using scheduling information associated with both Beacons, which includes their respective transmission intervals and any associated offsets.

Process 400 may progress to 408 by adding scheduling information, based at least in part on determining that the first transmission will be followed consecutively by the second transmission, to the first transmission indicating that the first transmission will be followed by the second transmission. The scheduling information may be added by AP 102 to the Beacon scheduling field of the first signal. In some embodiments, the first transmission may only contain a Beacon scheduling field if it will be consecutively followed by a transmission of the second signal. In some embodiments, the first transmission may always contain a Beacon scheduling field, and AP 102 may modify this Beacon scheduling field to indicate that the first transmission will be followed by the second transmission.

The methods and systems discussed in this application may be implemented at least partially on transitory or non-transitory computer-readable media having transitory or non-transitory computer-readable instructions stored thereon.

While various embodiments of the present disclosure have been shown and described herein, it will be obvious to those skilled in the art that such embodiments are described by way of example only. Numerous variations, changes, and substitutions will now occur to those skilled in the art without departing from this disclosure. It should be understood that various alternatives to the embodiments of the disclosure described herein may be employed in practicing the disclosure. It is intended that the following claims define the scope of the disclosure and that methods and systems within the scope of these claims and their equivalents be covered thereby.

What is claimed is:

1. A method for transmitting high efficiency signals, the method comprising:
    creating a first signal and a second signal, each of the first signal and the second signal comprising a plurality of information fields;
    determining respective intervals for repeated transmissions of each of the first signal and the second signal;
    determining whether a first transmission of the repeated transmissions of the first signal will be consecutively followed by a second transmission of the repeated transmissions of the second signal during a time period in which the repeated transmissions of the first signal and the repeated transmissions of the second signal are transmitted; and
    adding scheduling information, based at least in part on determining that the first transmission will be consecutively followed by the second transmission, to the first transmission indicating that the first transmission will be followed by the second transmission.

2. The method of claim 1, wherein a first interval for the repeated transmissions of the first signal is less than a second interval for the repeated transmissions of the second signal.

3. The method of claim 1, wherein determining whether the first transmission will be consecutively followed by the second transmission further comprises:
    determining whether a third transmission of the repeated transmissions of the first signal and the second transmission are both scheduled for transmission at a first time; and
    in response to determining that the third transmission and the second transmission are both scheduled for transmission at the first time, cancelling the third transmission.

4. The method of claim 1, wherein the first signal comprises a first partition of the plurality of information fields, and the second signal comprises the first partition of the plurality of information fields and a second partition of the plurality of information fields.

5. The method of claim 1, further comprising setting an offset between a first interval for the repeated transmissions of the first signal and a second interval for the repeated transmissions of the second signal.

6. The method of claim 1, further comprising:
    determining that the first transmission will not be consecutively followed by the second transmission; and
    removing, in response to determining that the first transmission will not be consecutively followed by the second transmission, the scheduling information from the first transmission.

7. The method of claim 1, further comprising modifying a first interval for the repeated transmissions of the first signal based on determining that an information field in a plurality of information fields of the first signal has been updated.

8. The method of claim 1, further comprising modifying a first interval for the repeated transmissions of the first signal based on a frequency of incoming requests.

9. The method of claim 1, wherein the scheduling information comprises at least one of a first time for a next transmission of the repeated transmissions of the first signal, a first interval for the repeated transmissions of the first signal, a format of the first signal, a second time for a next transmission of the repeated transmissions of the second signal, a second interval for the repeated transmissions of the second signal, and a format of the second signal.

10. The method of claim 1, wherein a plurality of information fields of the first signal comprises at least one of a timestamp and a Traffic Indicator Map (TIM).

11. A system for transmitting high efficiency signals, the system comprising control circuitry configured to:
    create a first signal and a second signal, each of the first signal and the second signal comprising a plurality of information fields;
    determine respective intervals for repeated transmissions of each of the first signal and the second signal;
    determine whether a first transmission of the repeated transmissions of the first signal will be consecutively followed by a second transmission of the repeated transmissions of the second signal during a time period in which the repeated transmissions of the first signal and the repeated transmissions of the second signal are transmitted; and
    add scheduling information, based at least in part on determining that the first transmission will be consecutively followed by the second transmission, to the first transmission indicating that the first transmission will be followed by the second transmission.

12. The system of claim 11, wherein a first interval for the repeated transmissions of the first signal is less than a second interval for the repeated transmissions of the second signal.

13. The system of claim 11, wherein the control circuitry configured to determine whether the first transmission will be consecutively followed by the second transmission is further configured to:
   determine whether a third transmission of the repeated transmissions of the first signal and the second transmission are both scheduled for transmission at a first time; and
   in response to determining that the third transmission and the second transmission are both scheduled for transmission at the first time, cancel the third transmission.

14. The system of claim 11, wherein the first signal comprises a first partition of the plurality of information fields, and the second signal comprises the first partition of the plurality of information fields and a second partition of the plurality of information fields.

15. The system of claim 11, wherein the control circuitry is further configured to set an offset between a first interval for the repeated transmissions of the first signal and a second interval for the repeated transmissions of the second signal.

16. The system of claim 11, wherein the control circuitry is further configured to:
   determine that the first transmission will not be consecutively followed by the second transmission; and
   remove, in response to determining that the first transmission will not be consecutively followed by the second transmission, the scheduling information from the first transmission.

17. The system of claim 11, wherein the control circuitry is further configured to modify a first interval for the repeated transmissions of the first signal based on determining that an information field in a plurality of information fields of the first signal has been updated.

18. The system of claim 11, wherein the control circuitry is further configured to modify a first interval for the repeated transmissions of the first signal based on a frequency of incoming requests.

19. The system of claim 11, wherein the scheduling information comprises at least one of a first time for a next transmission of the repeated transmissions of the first signal, a first interval for the repeated transmissions of the first signal, a format of the first signal, a second time for a next transmission of the repeated transmissions of the second signal, a second interval for the repeated transmissions of the second signal, and a format of the second signal.

20. The system of claim 11, wherein a plurality of information fields of the first signal comprises at least one of a timestamp and a Traffic Indicator Map (TIM).

* * * * *